United States Patent
Oh et al.

(10) Patent No.: US 11,088,380 B2
(45) Date of Patent: Aug. 10, 2021

(54) ELECTROLYTE SOLUTION FOR REDOX FLOW BATTERY AND REDOX FLOW BATTERY COMPRISING SAME

(71) Applicant: Seoul National University R&DB Foundation, Seoul (KR)

(72) Inventors: Seung Mo Oh, Seoul (KR); Hyun-seung Kim, Seoul (KR); Youngjin Kim, Seoul (KR); Taeho Yoon, Seoul (KR); Ji Heon Ryu, Siheung-si (KR); Junsoo Jang, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/713,765

(22) Filed: Dec. 13, 2019

(65) Prior Publication Data

US 2020/0153021 A1    May 14, 2020

Related U.S. Application Data

(62) Division of application No. 15/028,034, filed as application No. PCT/KR2014/009535 on Oct. 10, 2014, now abandoned.

(30) Foreign Application Priority Data

Oct. 11, 2013    (KR) .................... 10-2013-0121473

(51) Int. Cl.
*H01M 4/90*    (2006.01)
*H01M 4/36*    (2006.01)
(Continued)

(52) U.S. Cl.
CPC .......... *H01M 8/188* (2013.01); *H01M 4/368* (2013.01); *H01M 4/60* (2013.01); *H01M 4/9008* (2013.01);
(Continued)

(58) Field of Classification Search
CPC ....... H01M 4/9008; H01M 2300/0005; H01M 2300/0025; H01M 2300/0028; H01M 8/188
See application file for complete search history.

(56) References Cited

U.S. PATENT DOCUMENTS 4,547,439 A      10/1985   Geniès
2003/0082444 A1   5/2003   Kuhr et al.
(Continued)

OTHER PUBLICATIONS

Devonport et al., "A Redox-Active Tetrathiafulvalene [2] Pseudorotaxane: Spectroelectrochemical and Cyclic Voltammetric Studies of the Highly-Reversible Complexation/Decomplexation Process," *J. Org. Chem.*, vol. 62, No. 4, 1997, pp. 885-887.
(Continued)

*Primary Examiner* — Golam Mowla
(74) *Attorney, Agent, or Firm* — Dority & Manning, P.A.

(57) ABSTRACT

The provided are an electrolyte for redox flow battery and a redox flow battery comprising the same, wherein the electrolyte for redox flow battery comprises a solute and a solvent, wherein said solute comprises at least one of anode active material and cathode active material, wherein said anode active material comprises at least one of organic compounds having a carbonyl group such as benzophenone-, benzoquinone-, dimethyl terephthalate-, and 1,4-diacetylbenzene-based organic compounds, and said cathode active material comprises at least one of amine-, tetrathiafulvalene-, and N,N,N',N'-tetramethyl-p-phenylenediamine-based organic compounds.

12 Claims, 7 Drawing Sheets

(51) Int. Cl.
  *H01M 4/60* (2006.01)
  *H01M 8/18* (2006.01)
  *H01M 8/02* (2016.01)
(52) U.S. Cl.
  CPC ...... *H01M 8/02* (2013.01); *H01M 2300/0005* (2013.01); *H01M 2300/0025* (2013.01); *H01M 2300/0028* (2013.01); *Y02E 60/50* (2013.01)

(56) References Cited

U.S. PATENT DOCUMENTS

| 2012/0028137 | A1  | 2/2012 | Chase et al. | |
|---|---|---|---|---|
| 2012/0077068 | A1* | 3/2012 | Wang | H01M 8/20 429/107 |
| 2012/0077084 | A1* | 3/2012 | Christensen | H01M 4/624 429/212 |
| 2013/0224538 | A1  | 8/2013 | Jansen et al. | |

OTHER PUBLICATIONS

Kohl et al., "Semiconductor Electrodes," *Journal of the Electrochemical Society*, vol. 126, No. 4, Apr. 1979, pp. 604-608.

Long et al, "Oxidation of Several p-Phenylenediamines in Room Temperature Ionic Liquids: Estimation of Transport and Electrode Kinetic Parameters," *J. Phys. Chem. C*, vol. 112, No. 17, 2008, pp. 6993-7000.

Seo et al., "Anodic Oxidation Pathways of Aromatic Amines. Electrochemical and Electron Paramagnetic Resonance Studies," *Journal of the American Chemical Society*, 88:15, Aug. 5, 1966, pp. 3498-3503.

International Search Report for PCT/KR2014/009535, dated Jan. 25, 2015, 3 pages.

\* cited by examiner

ELECTROLYTE SOLUTION FOR REDOX FLOW BATTERY AND REDOX FLOW BATTERY COMPRISING SAME

CROSS REFERENCE TO RELATED APPLICATIONS

This application is a divisional application of U.S. patent application Ser. No. 15/028,034 having a filing date of Apr. 8, 2016, which is the national stage entry of International Patent. Application No. PCT/KR2014/009535 having a filing date of Oct. 10, 2014, which claims priority to and the benefit of Korean Patent Application No. 10-2013-0121473 filed in the Korean Intellectual Property Office on Oct. 11, 2013, the entire contents of which are incorporated herein by reference.

FIELD

The present invention relates to an electrolyte for redox flow battery and a redox flow battery comprising the same, more particularly, to an electrolyte for redox flow battery which can provide a markedly high operating voltage and an improved energy density of the redox flow battery due to an improved solubility of a solute in a solvent compared to conventional non-aqueous systems, by applying the solute (active material, redox couple) and the solvent optimized to the redox flow battery, and a redox flow battery comprising the same.

BACKGROUND

With the development of personal IT devices in the information society, the dependency for electric energy has increased, making the technology to efficiently store and use such energy be more important than ever before. As a new renewable energy as an energy source to replace petroleum has particularly come into focus, a stable energy supply through such related generation systems has become necessary, and for the efficient supply of energy through conventional energy generation facilities, a medium-large energy storage system (ESS), together with a smart grid is becoming more important.

Here, a redox flow battery, a secondary battery which is both economical and has a long life, is receiving the spotlight. Unlike conventional secondary battery using lithium and sodium, the redox flow battery wherein an active material is dissolved in a solvent has a capacity expression mechanism by which it can be charged and discharged through an oxidation-reduction reaction of each active material of anode and cathode. Because the redox flow battery is a secondary battery wherein the electrode active material is dissolved in a solvent to cause a reaction, a change in a standard reduction potential of a redox couple of the active materials dissolved in an anode electrolyte and a cathode electrolyte determines an operating voltage of cell due to a difference in each electric potential.

Furthermore, because a capacity of the redox flow battery is expressed due to the oxidation-reduction reaction of an electrolyte supplied by the external tank, it is easy to control the entire cell's capacity by controlling the size of the external storage tank. Furthermore, unlike conventional batteries (for example lithium ion battery) where ions are inserted/eliminated into/from an electrode active material, the oxidation-reduction reaction of active materials of a redox flow battery, a redox couple, occurs on the surfaces of an anode and a cathode, thus the deterioration of electrode is small and thus the battery has a longer life. For the active material and solvent for the redox flow battery, vanadium group salt and water were mainly used, respectively. The representative example of such redox flow battery is all-vanadium redox flow battery wherein vanadium salts are dissolved in each of anode and cathode electrolytes.

Another important feature is that a medium-large energy storage system is not affected by the surrounding environment condition such as temperature and the like. Considering this and the like, conventional aqueous systems are in need of improvement. Because all-vanadium battery uses water as a solvent, it has some problems. First, if a cell is operated at an electric potential of higher than 1.23V, which is the electrochemical stability window of water, a loss of electrolyte occurs due to a decomposition of the solvent, and as a result, there are limitations in terms of an operating voltage of aqueous-based redox flow battery.

Next, because of the thermodynamic nature of water, operation of an aqueous-based redox flow battery is difficult at a temperature below 0° C., and thus there are limitations to the environment in which it can be used. Furthermore, there are problems due to active materials of all-vanadium battery, for example due to sedimentation of a cathode active material at high temperature. M. Skyllas-Kazacos, *JOURNAL OF APPLIED ELECTROCHEMISTRY*, 20, 463-467 (1990) reported that in case of the most widely known sulfuric acid-based active material which is a representative active material for all-vanadium redox flow battery, a pentavalent vanadium settled in the form of vanadium penoxide ($V_2O_5$) at around 40° C. Because of this characteristic, the sulfuric acid-based electrolyte for all-vanadium redox flow battery reveals a problem that a solute density which directly affects to a capacity is decreased due to such sedimentation. For the application to medium-large electric power storage systems where high capacity, long life, and high stability are important, low operating voltage and narrow range of temperature for use are significant problems.

The redox flow battery which uses a non-aqueous (organic) solvent, has an operating voltage of 1.5 to 2 times higher than that of conventional aqueous systems, and thus, can improve energy density, has been presented. Compared to conventional aqueous electrolyte-based redox flow batteries, the redox flow battery using an organic solvent has benefits that limitations in selection of a redox couple due to a decomposition voltage of water and in working temperature due to a freezing point of water can be minimized, and problems due to sedimentation of vanadium salt at high temperature do not exist. However, according to the existing studies, compared to the conventional aqueous systems, the organic solvent-based redox flow battery reveals some problems as follows: the solubility of active materials, a redox couple, in a solvent is mostly less than 0.1M which is very low, as reported by Wang, *Advanced Functional Materials*, 23, 970-986 (2013), and an improvement by use of materials wherein a difference in the standard reduction potential between cathode active material and anode active material is smaller than or similar with that of the aqueous systems was not noticeable, as reported by Sleightholme, the *Journal of power sources*, 196, 5742-5745. Therefore, for solve these problems, it is required that a large amount of solute should be dissolved in a solvent, while at the same time, the difference in the standard reduction potential of a redox couple used in the anode and cathode should be wider than that of aqueous systems, in order for such organic system to be effective.

Therefore, there is a need to develop an electrolyte for redox flow battery, which has an operating voltage higher than that of conventional aqueous systems, a solute solubility higher than that of the existing organic electrolytes, and thereby a high energy density and stable life property compared to conventional systems.

SUMMARY

The purpose of the present invention is to solve the problems of the conventional techniques, specifically, to provide an electrolyte for redox flow battery and a redox flow battery comprising the same by applying a solute(an active material, a redox couple) optimized to the redox flow battery so that a larger amount of solute can be dissolved in a solvent compared to conventionally known redox batteries, and thus exhibiting a high capacity per volume and a big difference in reaction voltages between two redox couples, thereby enabling to achieve a higher operating voltage and a higher energy density.

Furthermore, the purpose of the present invention is to provide an electrolyte for redox flow battery and a redox flow battery comprising the same, by using a solute and a solvent optimized to the redox flow battery, which can exhibit a higher operating voltage, as well as an improved solubility of the solute in the solvent compared to conventional non-aqueous systems, thus markedly improving an energy density of the redox flow battery.

Furthermore, the purpose of the present invention is to provide an electrolyte for redox flow battery and a redox flow battery comprising the same, in which due to a stable electrochemical reaction of solute (redox couple), a stable life property is achieved without a decomposition of the electrolyte during continuous and repeated oxidation-reduction reaction, and, unlike electrolytes using metal-ligand compounds (metal complexes), by using organic matters, it is possible to lower manufacturing costs.

To achieve said purposes, the electrolyte for redox flow battery according to the present invention may comprise a solvent and a solute, wherein said solute may comprise at least one of anode active material and cathode active material, wherein said anode active material may comprise at least one of organic compounds having carbonyl group such as benzophenone-, benzoquinone-, dimethyl terephthalate-, and 1,4 diacetylbenzene-based compounds, and said cathode active material may comprise at least of one of tetrathiafulvalene-, and N,N,N',N'-tetramethyl-p-phenylenediamine-based organic compounds.

The solvent may comprise a non-aqueous (organic) solvent, and said solvent may further comprise an aqueous solvent.

Upon confirming an oxidation-reduction reaction of the electrolyte comprising said solute in a concentration of 0.01M using cyclic voltammetry at a scanning speed of 100 mV s−1, the difference between two potentials where each peak current for oxidation and reduction reactions is confirmed (Difference between maximum oxidation potential and maximum reduction potential, Epa-Epc) may be 0.5V or less.

Furthermore, the anode active material may comprise at least one of substituents of hydrogen, methyl group, ethyl group, benzyl group, butoxycarbonylmethyl group, carboxymethyl group and aminocarbonylmethyl group, and the cathode active material may comprise at least one of substituents of hydrogen, methyl group, ethyl group, benzyl group, butoxycarbonylmethyl group, carboxymethyl group and aminocarbonylmethyl group.

Furthermore, the organic solvent may comprise at least one of acetonitrile, dimethylcarbonate, diethylcarbonate, dimethylsulfoxide, dimethylformamide, propylene carbonate, ethylene carbonate, N-methyl-2-pyrrolidone, and fluoroethylene carbonate, and the aqueous solvent may comprise at least one of sulfuric acid, hydrochloric acid, and phosphoric acid. The solubility of electrolyte in the solvent may be 0.1M to 10M.

Furthermore, the potential difference between a reduction reaction in an anode electrolyte wherein the anode active material is dissolved in the solvent and an oxidation reaction in the cathode electrolyte wherein the cathode active material is dissolved in the solvent may be 1.4V or more.

The redox flow battery of the present invention may comprise at least two of metal-ligand compound, anode active material and cathode active material, wherein said metal-ligand compound may constitute a cathode and the electrolyte comprising said anode active material may constitute an anode, or said metal-ligand compound may constitute an anode and the electrolyte comprising said cathode active material may constitute a cathode.

Preferably, the redox flow battery of the present invention may comprise an anode with the electrolyte comprising said anode active material, a cathode with the electrolyte comprising said cathode active material, and a solvent.

According to the present invention, unlike conventional techniques, by applying a solute optimized to a redox flow battery, a larger amount of solute can be dissolved in a solvent compared to conventionally known redox flow batteries, thus enabling to achieve a high capacity per volume, and because a potential difference between the reactions of two redox couples is high, a battery with a high energy density due to a high operating voltage can be realized.

Furthermore, according to the present invention, by using a solute and a solvent optimized to a redox flow battery, a solubility of the solute in the solvent is higher than that in the conventional aqueous systems, thus resulting in a redox flow battery which can exhibit a higher operating voltage and have a markedly improved energy density.

Furthermore, due to a stable electrochemical reaction of solute (redox couple), a stable life of a battery can be ensured without a decomposition of electrolyte even through repeated redox reaction, and by using organic matters unlike electrolytes using metal-ligand compounds (metal complexes), it is possible to lower manufacturing costs.

DETAILED DESCRIPTION

Figure 1:
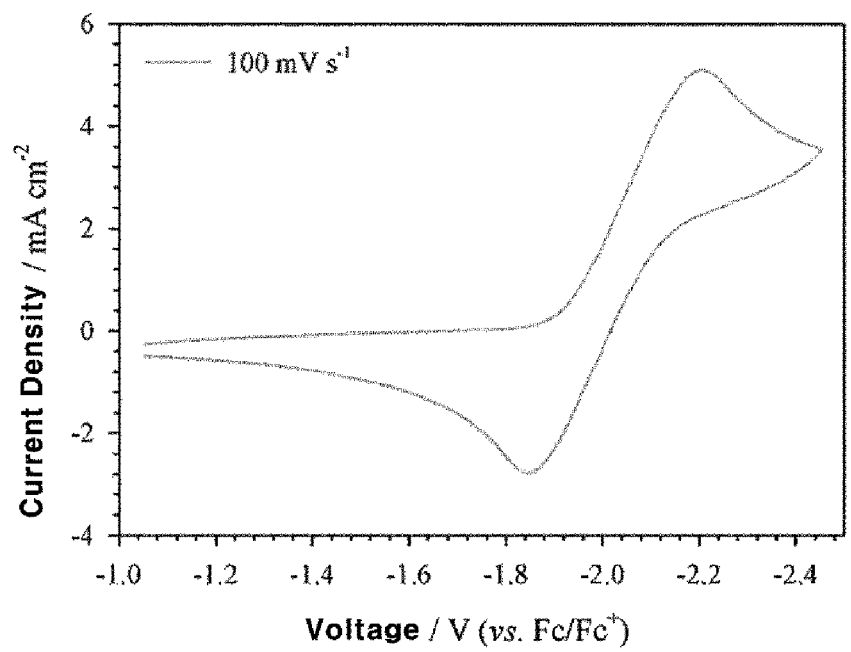
FIG. 1 is a current-voltage curve of Example 1 by a cyclic voltammetry method.
Figure 2:
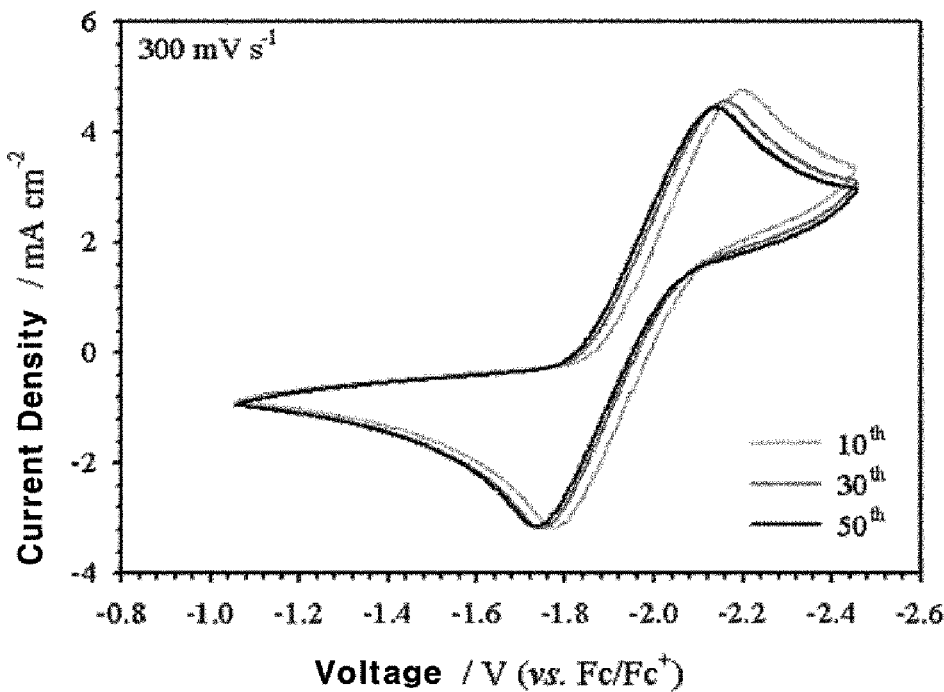
FIG. 2 is a current-voltage curve showing the life properties of Example 1.
Figure 3:
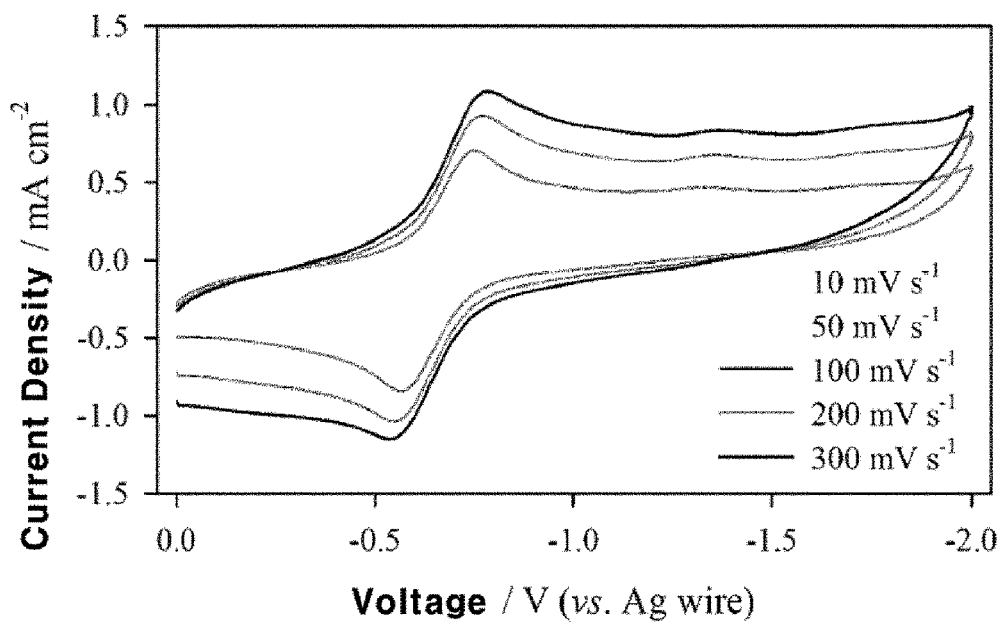
FIG. 3 is a current-voltage curve of Example 2 by a cyclic voltammetry method.
Figure 4:
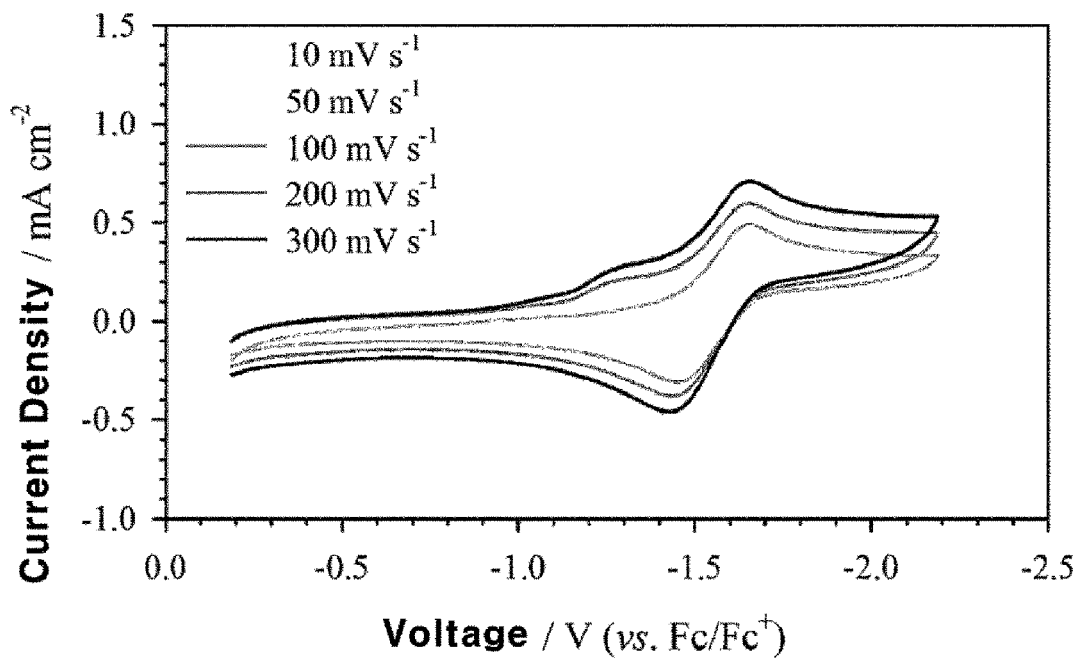
FIG. 4 is a current-voltage curve of Example 3 by a cyclic voltammetry method.
Figure 5:
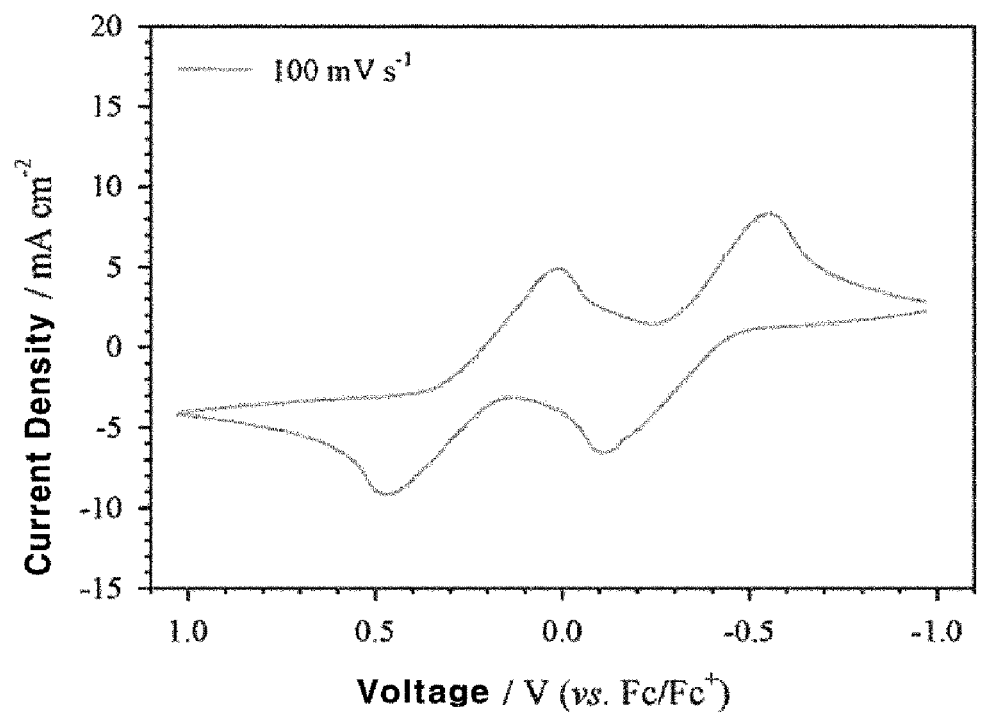
FIG. 5 is a current-voltage curve of Example 4 by a cyclic voltammetry method.
Figure 6:
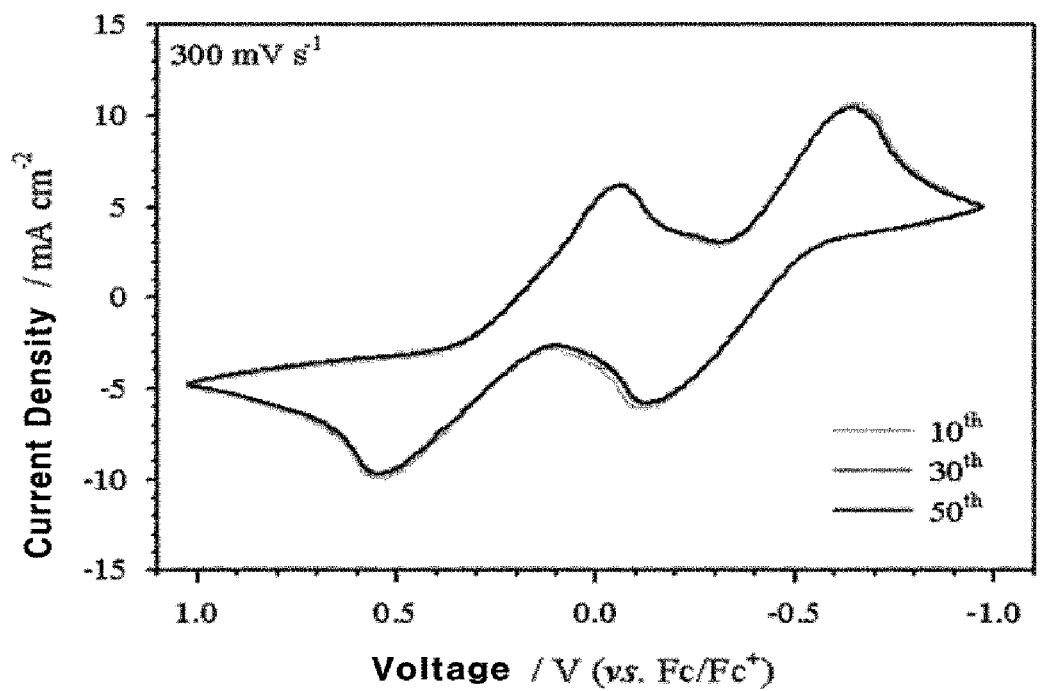
FIG. 6 is a current-voltage curve showing the life properties of Example 4.
Figure 7:
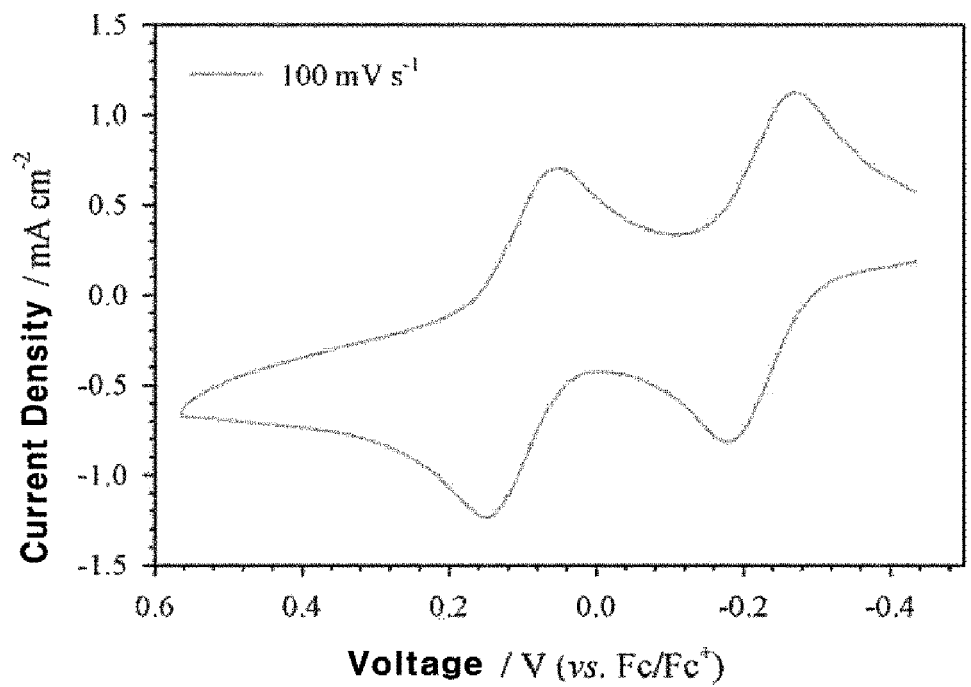
FIG. 7 is a current-voltage curve of Example 5 by a cyclic voltammetry method
Figure 8:
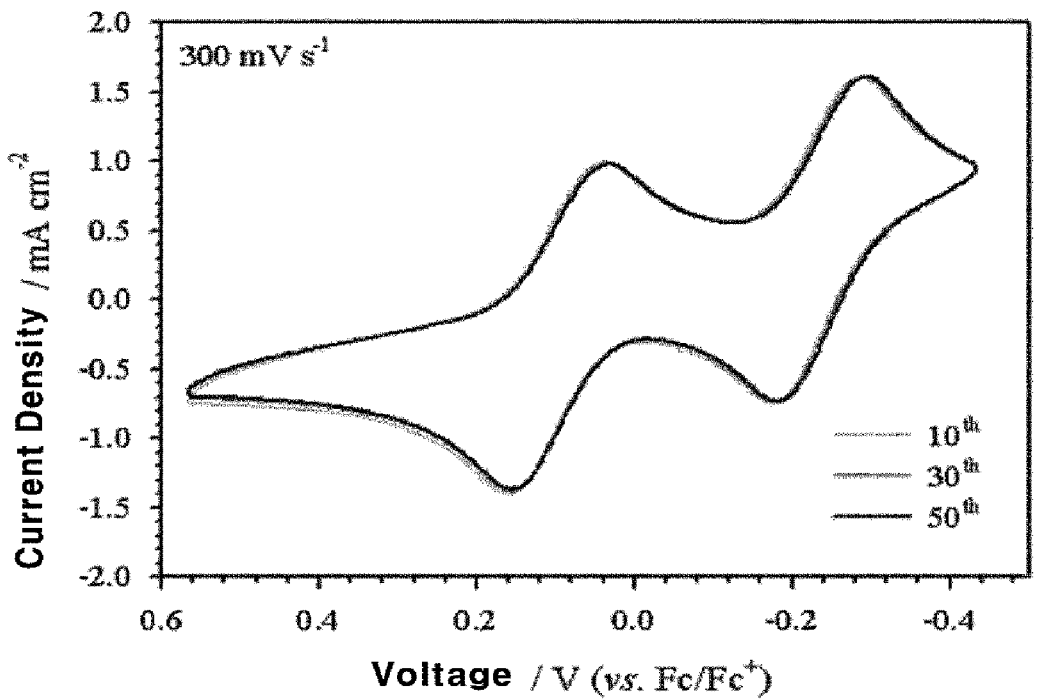
FIG. 8 is a current-voltage curve showing the life properties of Example 5.
Figure 9:
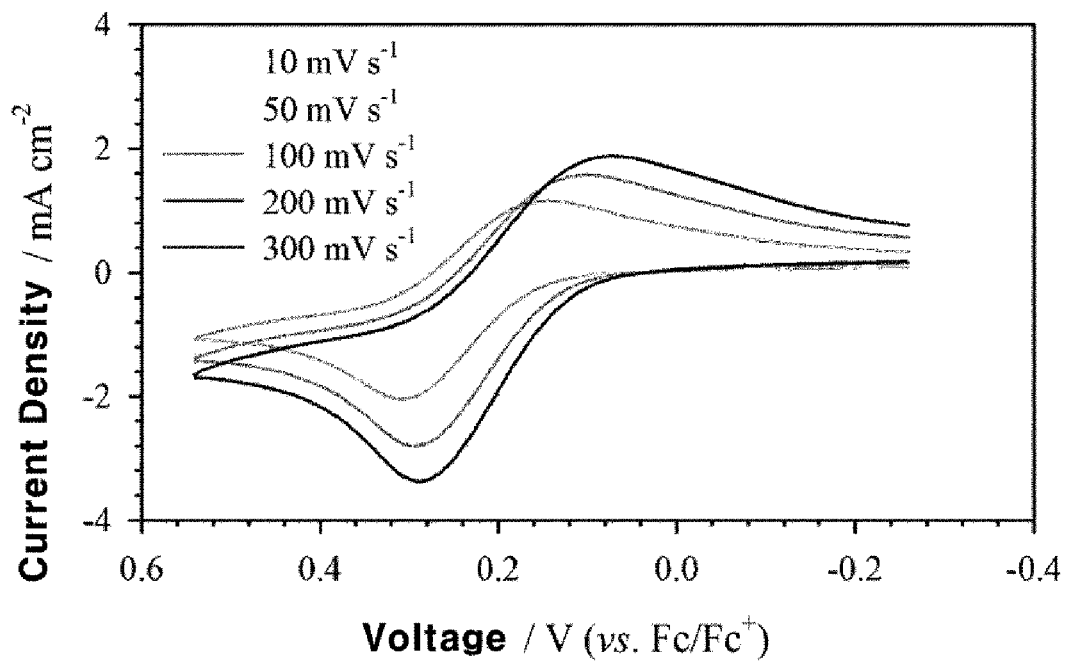
FIG. 9 is current-voltage curve of Example 6 by a cyclic voltammetry method.
Figure 10:
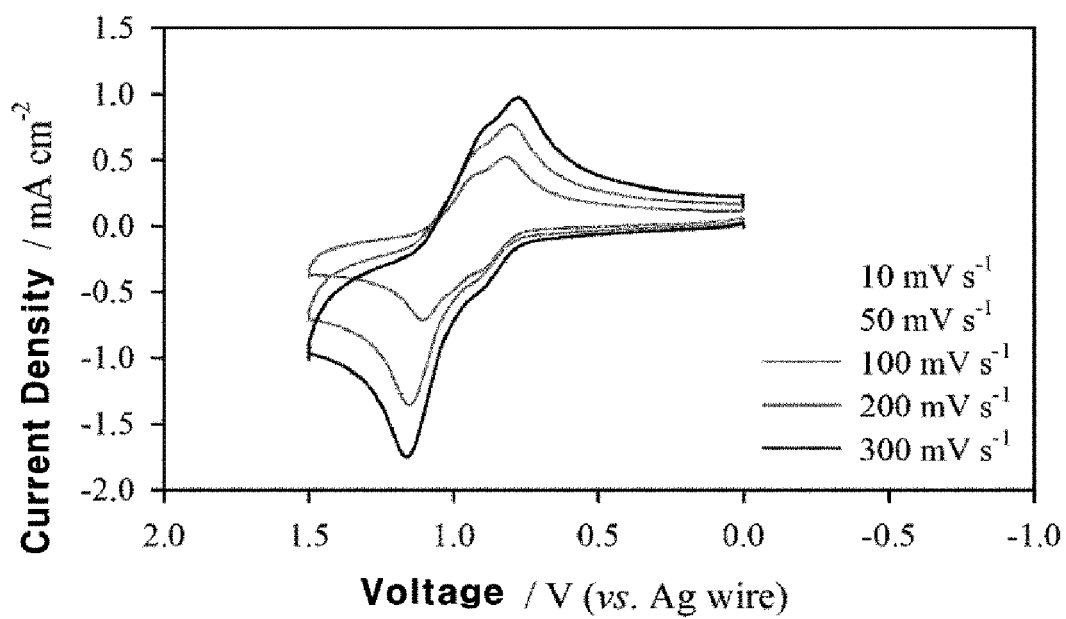
FIG. 10 is a current-voltage curve of Example 7 by a cyclic voltammetry method.
Figure 11:
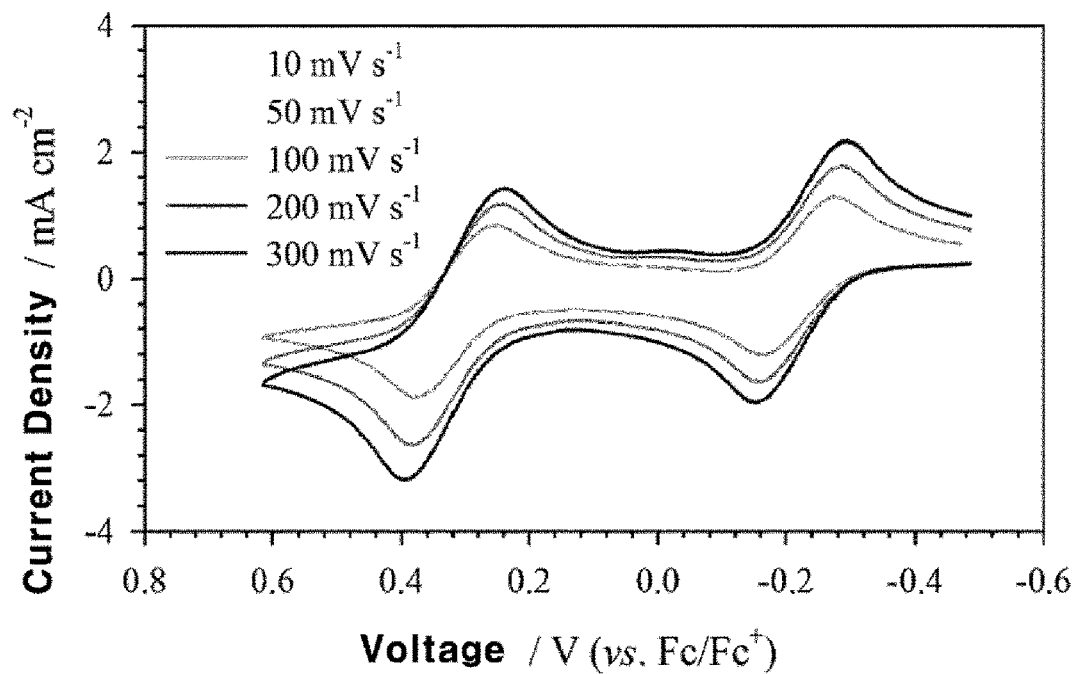
FIG. 11 is a current-voltage curve Example 8 by a cyclic voltammetry method.
Figure 12:
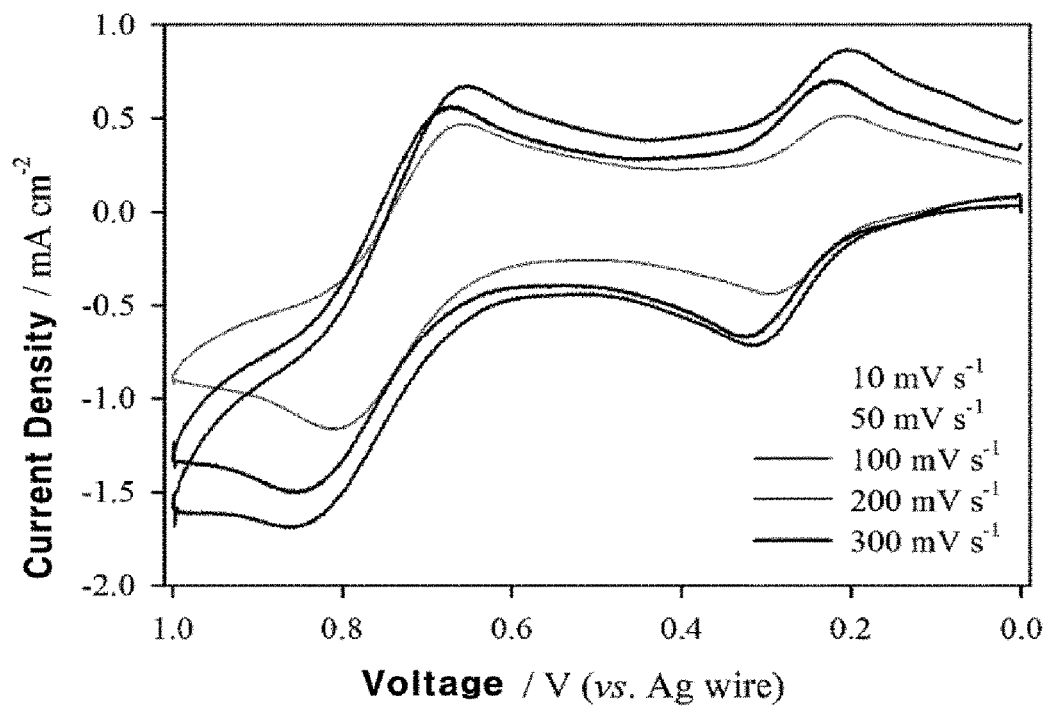
FIG. 12 is a current-voltammetry curve of Example 9 by a cyclic voltammetry method.

Hereinafter, an electrolyte for a redox flow battery and a redox flow battery comprising the same according to the present invention will be explained in detail with reference to the drawings. The present invention can be better understood by referring to the following embodiments. However, the embodiments are intended to illustrate the present invention, but not to limit the scope of the present invention which is defined by the claims.

First, the electrolyte for redox flow battery according to the present invention may comprise a solute and a solvent, wherein said solute may comprise at least one of an anode active material and a cathode active material.

The anode active material may comprise at least one of organic compounds having carbonyl group such as benzophenone-, benzoquinone-, dimethyl terephthalate-, and 1,4-diacetylbenzene-based compounds. Preferably, the compounds may comprise at least one of substituents of hydrogen, methyl group, ethyl group, benzyl group, butoxycarbonylmethyl group, carboxylmethyl group and aminocarbonylmethyl group.

For example, the anode active material may be at least one of the compounds represented by the following formulas:

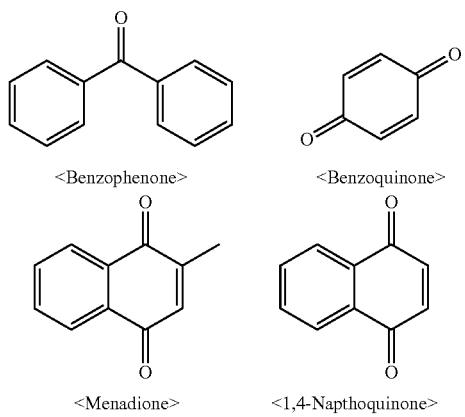

The term "an anode active material" refers to a redox couple dissolved in an anode electrolyte, and when reduced to the lower of two oxidation states of the redox couple, a battery is charged.

Furthermore, the cathode active material may comprise at least one of amine-, tetrathiafulvalene-, and N,N,N',N'-tetramethyl-p-phenylenediamine-based organic compounds. Preferably, the compounds may comprise at least one of substituents of hydrogen, methyl group, ethyl group, benzyl group, butoxycarbonylmethyl group, carboxymethyl group and aminocarbonylmethyl group.

For example, the cathode active material may be at least one of the compounds represented by the following formulas:

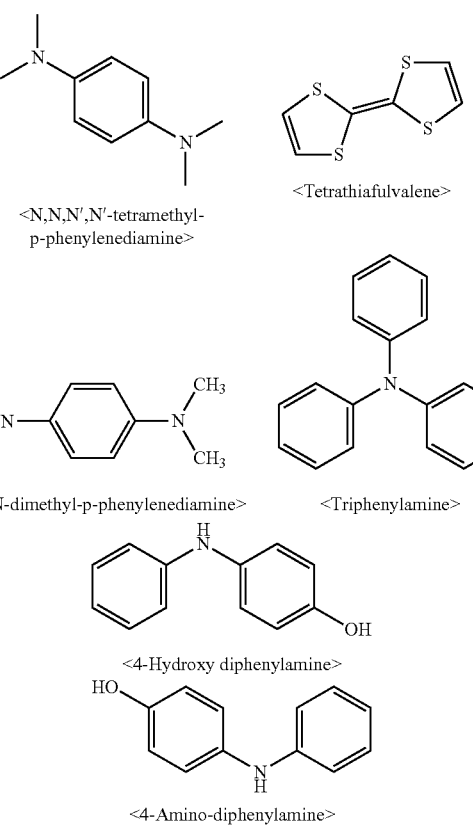

The term "a cathode active material" refers to a redox couple dissolved in a cathode electrolyte, and when it is oxidated to the higher state of two oxidation states of the redox couple, a battery is charged.

The anode active material, the cathode active material and their derivatives perform a stable electrochemical reaction in the redox flow battery, and in the case of organic compound with ketone function group, an electrochemical reduction occurs at a very low voltage, thus when this compound and other cathode material are combined, a very high operating voltage can be expected.

Said anode active material and said cathode active material can be combined with metal-ligand compounds, and in order to achieve a preferable energy density level, each operating voltage obtained from the oxidation and reduction of such combination should be higher than a maximum operating voltage of an aqueous system of 1.23V.

Therefore, it is preferred that a maximum reduction potential of the anode electrolyte has a more negative value than −2.0V compared to Fc/Fc$^+$(Ferrocene/Ferrocenium) reference electrode, a maximum oxidation potential of the cathode electrolyte has a more positive value than −0.5V compared to Fc/Fc$^+$ reference electrode, and a potential difference between an oxidation reaction and a reduction reaction of the anode electrolyte wherein said anode active material is dissolved in said solvent and the cathode electrolyte wherein said cathode active material is dissolved in said solvent is 1.4V or more.

Furthermore, all redox couples have a high electrochemical reversibility, and thus the difference between an oxidation potential and an reduction potential should be small. If not, when constructing a final battery, the voltage difference between charging and discharging becomes too high, which may decrease an energy efficiency of the battery. Therefore, the difference in voltage (peak potential) between the oxidation and reduction reactions of an anode active material and a cathode active material should be small.

Therefore, in the present invention, when a redox reaction of said solute of 0.01M is analyzed using cyclic voltammetry which is a representative electrochemical analysis method for measuring potential in a redox reaction, at a scanning speed of 100 mV s−1, the difference between the oxidation potential and the reduction potential (Epa-Epc) where each peak current of said redox reaction is confirmed should preferably be 0.5V or less. This is because the small difference in the potentials is preferable in terms of the energy efficiency realized in a battery.

Next, as the solvent to dissolve the solute, it is preferable to use an organic solvent, but the organic solvent can be used in combination with an aqueous solvent.

Preferably, to maximize the solubility of the solute, said organic solvent may include at least one of acetonitrile, dimethylcarbonate, diethylcarbonate, dimethylsulfoxide, dimethylformamide, propylene carbonate, ethylene carbonate, N-methyl-2-pyrrolidone, and fluoroethylene carbonate.

Preferably, said aqueous solvent may include at least one of sulfuric acid, hydrochloric acid, and phosphoric acid.

Further, the electrolyte may further comprise a supporting electrolyte to additionally provide the conductivity to the electrolyte. Preferable examples of the supporting electrolyte may include at least one of ammonium salt-, lithium salt-, and sodium salt-based supporting electrolytes.

Furthermore, it is preferable that the solubility of the solute in the solvent may be 0.1 M to 10 M, and more preferably 1 M to 10 M. If the concentration of the solute dissolved in the electrolyte is 0.1M or more, it is more advantageous than conventional organic-based electrolyte systems, but in order to have a higher energy density than vanadium-based aqueous systems, it is preferable that 1M or more of the solute is dissolved in the electrolyte. If it is less than 0.1M, the energy density is significantly low so that there is a difficulty to achieve the effects by the present invention, and if it exceeds 10M, the viscosity of the electrolyte will be high so that pumping the electrolyte is difficult, and a solute sedimentation can occur in the supersaturated electrolyte solution.

Furthermore, to realize a higher operating voltage, a cell may be constructed using the anode active material of the present invention which has a very low reaction voltage and a metal-ligand compound which has a high reaction voltage, or in the opposite, using the cathode active material of the present invention which has a high reaction voltage and a metal-ligand compound with a low reaction voltage.

For the metal-ligand compound, it is preferable to use at least one of metal-acetylacetonates, metal-biphenyls, and metal-tetradendate tetradecane-based nitrogen-ligand compounds.

Next, a redox flow battery according to the present invention may comprise at least two of metal-ligand compound, the anode active material of the present invention and the cathode active material of the present invention.

In preferable embodiment, the redox flow battery according to the present invention may be constructed using the metal-ligand compound as a cathode and an electrolyte comprising the anode active material as an anode; or the metal-ligand compound as an anode and an electrolyte comprising the cathode active material as a cathode; or an electrolyte comprising the anode active material as an anode and an electrolyte comprising the cathode active material as a cathode. The redox flow battery may further comprise the solvent.

In other words, the present invention relates to a redox flow battery electrolyte comprising a solvent and a solute, wherein the solute comprises an organic compound which can perform a stable electrochemical reaction, migrate one or more electrons during the reaction, and stably be dissolved in the solvent.

Each of the following embodiments of the present invention includes a process for preparing electrolyte in which the organic compound is dissolved in the organic solvent, and the electrolyte prepared by the same, wherein when a redox reaction of the compound occurs, one or more electrons migrate, and stable radicals are generated by an electrochemical reaction and exist in the electrolyte in a stable state. This means that any sedimentation does not take place in the electrolyte.

Hereinafter, to prove the superiority the redox flow battery electrolyte and redox flow battery comprising the same according to the present invention, various experiments on Examples and Comparative example were conducted, of which results are as follows.

Example 1

Electrolyte Comprising Benzophenone 0.01M of benzophenone purchased from Daejung Chemicals was dissolved in propylene carbonate solution comprising tetrafluoroborate tetraethylammonium to prepare the electrolyte.

Example 2

Electrolyte Comprising Menadione 0.01M of menadione purchased from Sigma Aldrich was dissolved in propylene carbonate solution comprising tetrafluoroborate tetraethylammonium to prepare the electrolyte.

Example 3

Electrolyte Comprising 1,4-Naphthoquinone 0.01M of 1,4-Naphthoquinone purchased from Sigma Aldrich was dissolved in propylene carbonate solution comprising tetrafluoroborate tetraethylammonium to prepare the electrolyte.

Example 4

Electrolyte Comprising N,N,N'N'-Tetramethyl-P-Phenylenediamine 0.01M of N,N,N'N'-tetramethyl-p-phenylenediamine purchased from Alfa aesar was dissolved in propylene carbonate solution comprising tetrafluoroborate tetraethylammonium to prepare the electrolyte.

Example 5

Electrolyte Comprising Tetrathiafulvalene 0.01M of Tetrathiafulvalene purchased from Sigma Aldrich was dissolved in propylene carbonate solution comprising tetrafluoroborate tetraethylammonium to prepare the electrolyte.

Example 6

Electrolyte Comprising N,N-Dimethyl-P-Phenylenediamine 0.01M of N,N-dimethyl-p-phenylenediamine purchased from Sigma Aldrich was dissolved in propylene carbonate solution comprising tetrafluoroborate tetraethylammonium to prepare the electrolyte.

Example 7

Electrolyte Comprising Triphenylamine 0.01M of Triphenylamine purchased from Sigma Aldrich was dissolved in propylene carbonate solution comprising tetrafluoroborate tetraethylammonium to prepare the electrolyte.

Example 8

Electrolyte Comprising 4-Hydroxydiphenylamine 0.01M of 4-hydroxydiphenylamine purchased from Sigma Aldrich was dissolved in propylene carbonate solution comprising tetrafluoroborate tetraethylammonium to prepare the electrolyte.

Example 9

Electrolyte Comprising 4-Amino-Diphenylamine 0.01M of 4-amino-diphenylamine purchased from Sigma Aldrich was dissolved in propylene carbonate solution comprising tetrafluoroborate tetraethylammonium to prepare the electrolyte.

Example 10

Experiment on Solubility of Benzophenone

Benzophenone purchased from Daejung Chemicals was dissolved in propylene carbonate solution comprising tetrafluoroborate tetraethylammonium and the maximum amount of benzophenone that can be dissolved was checked.

Example 11

Experiment on Solubility of Menadione

Menadione purchased from Sigma Aldrich was dissolved in propylene carbonate solution comprising tetrafluoroborate tetraethylammonium and the maximum amount of Menadione that can be dissolved was checked.

Example 12

Experiment on Solubility of 1,4-Naphthoquinone 1,4-Naphthoquinone purchased from Sigma Aldrich was dissolved in propylene carbonate solution comprising tetrafluoroborate tetraethylammonium and the maximum amount of 1,4-Naphthoquinone that can be dissolved was checked.

Example 13

Experiment on Solubility of N,N,N'N'-Tetramethyl-P-Phenylenediamine

N,N,N'N'-tetramethyl-p-phenylenediamine purchased from Alfa aesar was dissolved in propylene carbonate solution comprising tetrafluoroborate tetraethylammonium and the maximum amount of N,N,N'N'-tetramethyl-p-phenylenediamine that can be dissolved was checked.

Example 14

Experiment on Solubility of Tetrathiafulvalene

Tetrathiafulvalene purchased from Sigma Aldrich was dissolved in propylene carbonate solution comprising tetrafluoroborate tetraethylammonium and the maximum amount of tetrathiafulvalene that can be dissolved was checked.

Example 15

Experiment on Solubility of N,N-Dimethyl-P-Phenylenediamine

N,N-dimethyl-p-phenylenediamine purchased from Sigma Aldrich was dissolved in propylene carbonate solution comprising tetrafluoroborate tetraethylammonium and the maximum amount of N,N-dimethyl-p-phenylenediamine that can be dissolved was checked.

Example 16

Experiment on Solubility of Triphenylamine

Triphenylamine purchased from Sigma Aldrich was dissolved in propylene carbonate solution comprising tetrafluoroborate tetraethylammonium and the maximum amount of triphenylamine that can be dissolved was checked.

Example 17

Experiment on Solubility of 4-Hydroxydiphenylamine

4-Hydroxydiphenylamine purchased from Sigma Aldrich was dissolved in propylene carbonate solution comprising tetrafluoroborate tetraethylammonium and the maximum amount of 4-hydroxydiphenylamine that can be dissolved was checked.

Example 18

Experiment on Solubility of 4-Amino-Diphenylamine

4-Amino-diphenylamine purchased from Sigma Aldrich was dissolved in propylene carbonate solution comprising tetrafluoroborate tetraethylammonium and the maximum amount of 4-amino-diphenylamine that can be dissolved was checked.

Comparative Example 1

Aqueous Electrolyte Comprising VOSO$_4$

Energy density was calculated based on the data from *Journal of Power Sources*, 160, 716-32, published in 2006 by C.Ponce de Le'on.

Comparative Example 2

Electrolyte Comprising Thianthrene

Thianthrene purchased from Aldrich was dissolved in propylene carbonate solution comprising tetrafluoroborate tetraethylammonium and the maximum amount of thianthrene that can be dissolved was checked.

Cyclic Voltammetry

[Checking a Reaction Voltage of Electrolyte]

Experiments were conducted using electrolytes obtained from said Examples 1-9 at electric potential scanning speed of 100 mV s$^{-1}$.

The voltage ranges used for conducting the experiments are as follows: −1.05 V−−2.45 V (vs. Fc/Fc$^+$) for Example 1; −2 V-0 V (vs. Ag wire) for Example 2; −2.2 V−−0.2 V (vs. Fc/Fc$^+$) for Example 3; −1 V-1 V (vs. Fc/Fc$^+$) for Example 4; −0.45 V-0.55 V (vs. Fc/Fc$^+$) for Example 5; −0.25 V-0.55 V (vs. Fc/Fc$^+$) for Example 6; 0 V-1.5 V (vs. Ag wire) for Example 7; −0.5 V-0.6 V (vs. Fc/Fc$^+$) for Example 8; and 0 V-1.0 V (vs. Ag wire) for Example 9. Ag wire was used as a reference electrode or it was corrected to Fc/Fc$^+$ reference electrode. Glassy carbon electrode was used as a working electrode and white gold was used for a counter electrode. Electrochemical cell was prepared using such construction and the cyclic voltammetry experiment was conducted thereon.

[Checking a Reaction Voltage of an Anode Active Material]

The results from the experiment on Example 1 showed that the oxidation voltage and reduction voltage were 1.85 V and −2.21 V (vs. Fc/Fc$^+$) respectively, and thus it can be used as an anode active material for redox flow battery of voltage of −2.03 V (vs. Fc/Fc$^+$).

The results from the experiment on Example 2 showed that the oxidation voltage and reduction voltage were 0.56 V and −0.75 V (vs. Ag wire) respectively, and thus it can be used as an anode active material for redox flow battery of voltage of −0.66 V (vs. Ag wire).

The results from the experiment on Example 3 showed that the oxidation voltage and reduction voltage were 1.49 V and −1.62 V (vs. Fc/Fc$^+$) respectively, and thus it can be used as an anode active material for redox flow battery of voltage of −1.56 V (vs. Fc/Fc$^+$).

[Checking a Reaction Voltage of a Cathode Active Material]

The results from the experiment on Example 4 showed that the reduction voltage and oxidation voltage were −0.56 V, −0.10 V, 0 V, and 0.48 V (vs. Fc/Fc+) in that order, and thus it can be used as an cathode active material for redox flow battery performing two electrons reaction at −0.33 V and 0.24 V (vs. Fc/Fc$^+$).

The results from the experiment on Example 5 showed that the reduction voltage and oxidation voltage were −0.27 V, −0.17 V, 0.06 V, and 0.15 V (vs. Fc/Fc+) in that order, and thus it can be used as an cathode active material for redox flow battery performing two electrons reaction at −0.22 V and 0.11 V (vs. Fc/Fc$^+$).

The results from the experiment on Example 6 showed that the maximum reduction voltage and maximum oxidation voltage were 0.16 V and 0.30 V respectively, and thus it can be used as an cathode active material for redox flow battery performing one electron reaction at 0.23 V (vs. Fc/Fc$^+$).

The results from the experiment on Example 7 showed that the maximum reduction voltage and maximum oxidation voltage were 0.85 V and 0.30 V (vs. Ag wire) respectively, and thus it can be used as an cathode active material for redox flow battery performing one electron reaction at 0.96 V (vs. Ag wire).

The results from the experiment on Example 8 showed that the maximum reduction voltage and maximum oxidation voltage were −0.26 V, −0.19 V, 0.27 V, and 0.35 V (vs. Fc/Fc$^+$) in that order, and thus it can be used as an cathode active material for redox flow battery performing two electrons reaction at −0.23 V and 0.31 V (vs. Fc/Fc$^+$).

The results from the experiment on Example 9 showed that the maximum reduction voltage and maximum oxidation voltage were 0.20 V, 0.29 V, 0.66 V, and 0.80 V (vs. Ag wire) in that order, and thus it can be used as an cathode active material for redox flow battery performing two electrons reaction at 0.25 V and 0.73 V (vs. Ag wire).

The maximum oxidation and reduction voltages measured from Examples 1-9 are shown in Table 1.

TABLE 1

| | 1 Electron | | 2 Electron | |
| --- | --- | --- | --- | --- |
| | Oxidation maximum voltage | Reduction maximum voltage | Oxidation maximum voltage | Reduction maximum voltage |
| Example 1 | −1.85/V (vs. Fc/Fc$^+$) | −2.21/V (vs. Fc/Fc$^+$) | — | — |
| Example 2 | −0.56/V (vs. Ag wire) | −0.75/V (vs. Ag wire) | — | — |
| Example 3 | −1.49/V (vs. Fc/Fc$^+$) | −1.62/V (vs. Fc/Fc$^+$) | — | — |
| Example 4 | −0.10/V (vs. Fc/Fc$^+$) | −0.56/V (vs. Fc/Fc$^+$) | 0.48/V (vs. Fc/Fc$^+$) | 0.0/V (vs. Fc/Fc$^+$) |
| Example 5 | −0.17/V (vs. Fc/Fc$^+$) | −0.27/V (vs. Fc/Fc$^+$) | 0.15/V (vs. Fc/Fc$^+$) | 0.06/V (vs. Fc/Fc$^+$) |
| Example 6 | 0.30/V (vs. Fc/Fc$^+$) | 0.16/V (vs. Fc/Fc$^+$) | — | — |
| Example 7 | 1.07/V (vs. Ag wire) | 0.85/V (vs. Ag wire) | — | — |
| Example 8 | −0.19/V (vs. Fc/Fc$^+$) | −0.26/V (vs. Fc/Fc$^+$) | 0.35/V (vs. Fc/Fc$^+$) | 0.27/V (vs. Fc/Fc$^+$) |
| Example 9 | 0.29/V (vs. Ag wire) | 0.20/V (vs. Ag wire) | 0.80/V (vs. Ag wire) | 0.66/V (vs. Ag wire) |

Half-wave potentials measured from Examples 1-3 which are considered as the oxidation-reduction reaction voltages of the electrolytes are shown in Table 2.

TABLE 2

| | 1 Electron Reaction potential | 2 Electron Reaction potential |
| --- | --- | --- |
| Example 1 | −2.03/V (vs. Fc/Fc$^+$) | — |
| Example 2 | −0.66/V (vs. Ag wire) | — |
| Example 3 | −1.56/V (vs. Fc/Fc$^+$) | — |
| Example 4 | −0.33/V (vs. Fc/Fc$^+$) | 0.24/V (vs. Fc/Fc$^+$) |
| Example 5 | −0.22/V (vs. Fc/Fc$^+$) | 0.11/V (vs. Fc/Fc$^+$) |

TABLE 2-continued

|  | 1 Electron Reaction potential | 2 Electron Reaction potential |
|---|---|---|
| Example 6 | 0.23/V (vs. Fc/Fc$^+$) | — |
| Example 7 | 0.96/V (vs. Ag wire) | — |
| Example 8 | −0.23/V (vs. Fc/Fc$^+$) | 0.31/V (vs. Fc/Fc$^+$) |
| Example 9 | 0.25/V (vs. Ag wire) | 0.73/V (vs. Ag wire) |

[Checking Life Property of Material]

Experiments were conducted using electrolytes obtained from said Examples 1-9 at electric potential scanning speed of 300 mV s$^{-1}$.

The potential sweep ranges used for conducting the experiments are as follows: −1.05 V--2.45 V (vs. Fc/Fc$^+$) for Example 1; −2 V-0 V (vs. Ag wire) for Example 2; −2.2 V--0.2 V (vs. Fc/Fc$^+$) for Example 3; −1 V-1 V (vs. Fc/Fc$^+$) for Example 4; −0.45 V-0.55 V (vs. Fc/Fc$^+$) for Example 5; −0.25 V-0.55 V (vs. Fc/Fc$^+$) for Example 6; 0 V-1.5 V (vs. Ag wire) for Example 7; −0.5 V-0.6 V (vs. Fc/Fc$^+$) for Example 8; and 0 V-1.0 V (vs. Ag wire) for Example 9. Ag wire was used as a reference electrode or it was corrected to Fc/Fc$^+$ reference electrode. Glassy carbon electrode was used as a working electrode and white gold was used for a counter electrode. Electrochemical cell was prepared using such construction and the cyclic voltammetry experiment was conducted thereon.

Experiment results showed that after repeating 50 times of the redox reaction of each redox couple, there were no change in the reaction voltage and decrease in the current value. Through this, it was confirmed that even through repeated charging and discharging, the active materials of the present invention can perform the reaction stably and reversibly.

[Comparison of Voltage and Energy Density using Electrolyte's Solubility and Reaction Potential]

The maximum solubility of each electrolyte from Examples 10-18 is shown in Table 3. Even if it is the same organic active material, the organic active material of the present invention shows a higher solubility, and thus when used as an electrolyte for redox flow battery, can realize a higher capacity.

TABLE 3

|  | Solubility/M |
|---|---|
| Example 10 | 5M |
| Example 11 | 0.3M |
| Example 12 | 0.5M |
| Example 13 | 2M |
| Example 14 | 0.6M |
| Example 15 | 2M |
| Example 16 | Less than 0.1M |
| Example 17 | 4M |
| Example 18 | 4M |
| Comparative example 2 | 0.1M |

Considering the operating voltage of battery calculated from Table 2 and the maximum solubility described in Table 3, the expected maximum energy density was calculated, and the result is listed in Table 4 together with the result of Comparative example 1.

TABLE 4

| Combination | Maximum solubility/M | 1 Electron Operating voltage/V | 2 Electron Operating voltage/V | Maximum energy density/ Wh L$^{-1}$ |
|---|---|---|---|---|
| Example 1 + Example 4 | 4M/2M | 1.7 | 2.27 | 212.84 |
| Example 1 + Example 5 | 1.2M/0.6M | 1.81 | 2.14 | 63.53 |
| Comparative example 1 | 1M | 1.23 | — | 32.97 |

Figure 13:
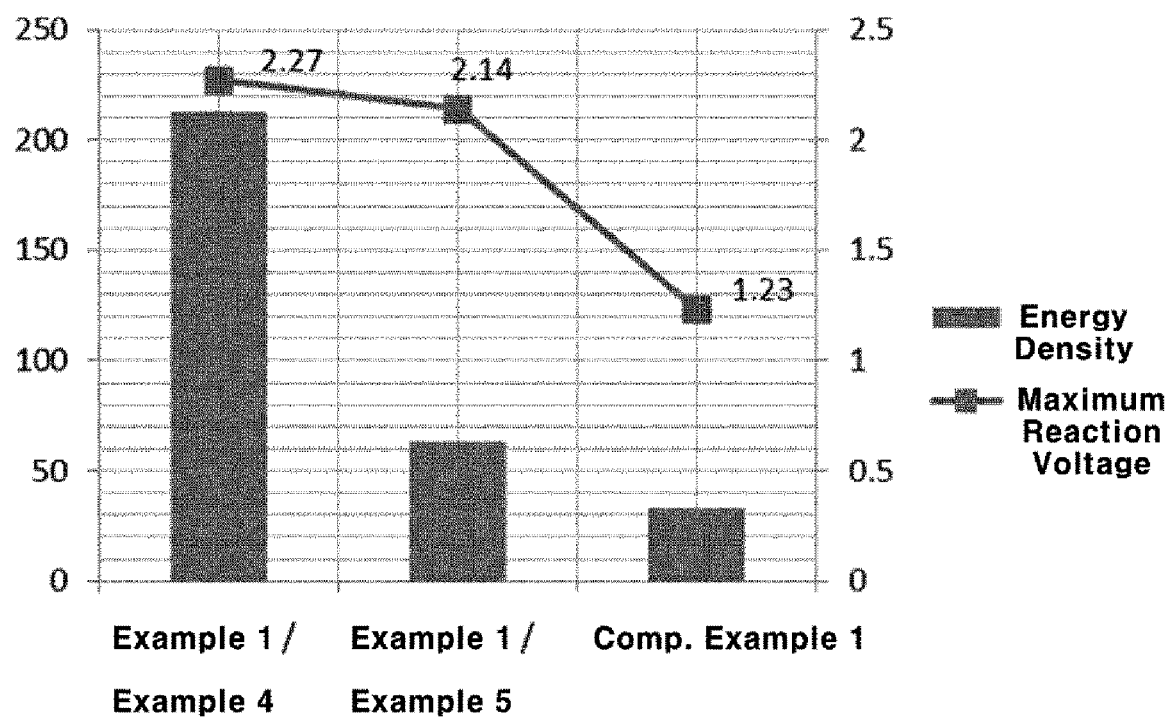
FIG. 13 is a graph showing energy densities and maximum reaction voltages of a combination of Examples 1 and 4, a combination of Examples 1 and 5, and Comparative Example 1.

As shown in Table 4, the energy densities from the combination of Examples 1 and 4, and the combination of Example 1 and 5 are much higher than that of Comparative example 1. These results are represented as graphs in FIG. 13.

The preferred examples were explained above, but various changes, modifications, and equivalents thereof can be applied for practicing the present invention. It is apparent that the examples in the present invention can be appropriately modified and applied. Therefore, the above disclosures do not limit the scope of the present invention defined by the appended claims.

INDUSTRIAL APPLICABILITY

The electrolyte for redox flow battery and the redox flow battery comprising the same according to the present invention have many advantageous industrial applications.

What is claimed is:

1. A redox flow battery comprising a cathode active material, and further comprising a metal-ligand compound or an anode active material, wherein the cathode active material comprises a N,N,N',N'-tetramethyl-p-phenylenediamine-based organic compound, wherein the redox flow battery provides 1.4V or more of potential difference between an oxidation reaction and a reduction reaction of the metal-ligand compound or an anode electrolyte comprising the anode active material and a cathode electrolyte comprising the cathode active material.

2. The redox flow battery of claim 1, wherein the cathode active material comprises at least one of hydrogen, a methyl group, an ethyl group, a benzyl group, a butoxycarbonylmethyl group, a carboxymethyl group, or an aminocarbonylmethyl group.

3. The redox flow battery of claim 1, wherein the metal-ligand compound constitutes an anode and the cathode electrolyte comprising the cathode active material constitutes a cathode.

4. The redox flow battery of claim 1, wherein the anode electrolyte comprising the anode active material constitutes an anode and the cathode electrolyte comprising the cathode active material constitutes a cathode.

5. The redox flow battery of claim 1, further comprising a solvent.

6. The redox flow battery of claim 5, wherein the solvent comprises an organic solvent.

7. The redox flow battery of claim 6, wherein the organic solvent comprises at least one of acetonitrile, dimethylcarbonate, diethylcarbonate, dimethylsulfoxide, dimethylformamide, propylene carbonate, ethylene carbonate, N-methyl-2-pyrrolidone and fluoroethylene carbonate.

8. The redox flow battery of claim 6, wherein the solvent further comprises an aqueous solvent.

9. The redox flow battery of claim 8, wherein the aqueous solvent comprises at least one of sulfuric acid, hydrochloric acid and phosphoric acid.

10. The redox flow battery of claim 5, wherein a solubility of the cathode active material in the solvent is 0.1M to 10M.

11. The redox flow battery of claim 1, wherein the anode active material comprises at least of one of a benzophenone-based organic compound and a benzoquinone-based organic compound.

12. The redox flow battery of claim 11, wherein the anode active material comprises at least one of hydrogen, a methyl group, an ethyl group, a benzyl group, a butoxycarbonylmethyl group, a carboxylmethyl group, or an aminocarbonylmethyl group.

* * * * *